(12) United States Patent
Bellandi (10) Patent No.: US 11,731,290 B2
(45) Date of Patent: Aug. 22, 2023

(54) SUSPENSION DEVICE OF SUCTION PADS OF MANIPULATORS

(71) Applicant: GIMATIC S.R.L., Roncadelle (IT)

(72) Inventor: Giuseppe Bellandi, Roncadelle (IT)

(73) Assignee: GIMATIC S.R.L., Roncadelle (IT)

( * ) Notice: Subject to any disclaimer, the term of this patent is extended or adjusted under 35 U.S.C. 154(b) by 548 days.

(21) Appl. No.: 16/955,929

(22) PCT Filed: Nov. 20, 2018

(86) PCT No.: PCT/IB2018/059134
§ 371 (c)(1),
(2) Date: Jun. 19, 2020

(87) PCT Pub. No.: WO2019/123047
PCT Pub. Date: Jun. 27, 2019

(65) Prior Publication Data
US 2020/0316790 A1    Oct. 8, 2020

(30) Foreign Application Priority Data

Dec. 22, 2017   (IT) .................. 102017000149264

(51) Int. Cl.
*B25J 15/06* (2006.01)
*B25J 17/02* (2006.01)
*B25J 19/00* (2006.01)

(52) U.S. Cl.
CPC ....... *B25J 15/0616* (2013.01); *B25J 17/0225* (2013.01); *B25J 19/0004* (2013.01)

(58) Field of Classification Search
CPC ................ B25J 15/0616; B25J 17/0225; B25J 19/0004; B25J 19/0091
See application file for complete search history.

(56) References Cited

U.S. PATENT DOCUMENTS

| | | | |
|---|---|---|---|
| 3,643,765 A | 2/1972 | Hanchen | |
| 4,577,732 A | 3/1986 | Gottling | |
| 5,193,776 A | 3/1993 | Nagai et al. | |
| 8,267,449 B2 * | 9/2012 | Maffeis | B65G 47/91 294/183 |
| 8,272,673 B2 * | 9/2012 | Lindsey, Jr. | H05K 13/0409 294/185 |
| 9,003,644 B2 * | 4/2015 | Looi | H05K 13/0413 414/752.1 |

(Continued)

FOREIGN PATENT DOCUMENTS

| | | |
|---|---|---|
| EP | 3100833 A1 | 12/2016 |
| JP | 4106450 B2 | 6/2008 |

(Continued)

*Primary Examiner* — Stephen A Vu
(74) *Attorney, Agent, or Firm* — Volpe Koenig (57) ABSTRACT

A suspension device of suction pads of industrial manipulators is described, which can also be defined as level compensator. The device includes a body and a telescopic stem passing through the body, and sliding between an extended position and a retracted position. A spring constantly applies a thrust on the stem to bring it to the extended position. The device is hollow to allow the suction of the air from the suction pad constrained to the stem. Advantageously the suspension device comprises a brake which can be activated to brake, i.e., slow down, the stroke of the stem or stop it completely.

9 Claims, 5 Drawing Sheets

(56) References Cited

U.S. PATENT DOCUMENTS

| | | | |
|---|---|---|---|
| 9,151,300 B2 * | 10/2015 | Cho | F04F 5/14 |
| 9,168,642 B2 * | 10/2015 | Cho | B25B 11/005 |
| 2016/0076563 A1 | 3/2016 | Cho | |

FOREIGN PATENT DOCUMENTS

| | | |
|---|---|---|
| JP | 2010188436 A | 9/2010 |
| JP | 2010188483 A | 9/2010 |
| KR | 100883882 B1 | 2/2009 |

\* cited by examiner

SUSPENSION DEVICE OF SUCTION PADS OF MANIPULATORS

FIELD OF THE INVENTION

The present invention relates to a suspension device of suction pads of manipulators, and in particular relates to a suspension device provided with a brake.

STATE OF THE ART

In the field of the industrial automation the use of robotic arms equipped with one or more suction pads for moving objects is known.

The suction pads are mounted at the end of the robotic arm and are connected with air suctioning means, so that when the suction pads adhere to the object to be picked up, vacuum can be created in their inside in order to make them effectively adhere to the object, that at this point can be lifted and displaced to a new release position. The release occurs by stopping the air suctioning and by lifting the suction pads from the object.

Usually between the robotic arm and each suction pad a suspension device, also called buffer device or level compensator, is provided whose function is to allow the associated suction pad to hold its own position on the piece to be picked up also when the robot has not completed its travel approaching the piece.

For example, the piece to be picked up can also be arched, as a car rooftop which has to be moved in a car factory. In this instance a robotic arm is equipped with several suction pads arranged to interact with the car rooftop; in the travel approaching the piece, not all the suction pads would come into contact with the same at the same time. This is one of the reasons why a compensation system is required.

In practice the suspension devices comprise a body that is constrained to the end of the robotic arm (end of arm) and a stem slidingly inserted in the body, for example through with respect to the body or telescopic, between a completely extended position and a completely retracted position. A spring acts on the stem in order to counter the movements towards the completely retracted position; the spring constantly applies a force urging the stem towards the completely extended position.

The suction pad is constrained to the distal end of the stem, whereas the proximal end of the stem is connected to an external air suctioning line, i.e. a vacuum line. In fact, the suspension devices are hollow, i.e. both the body and the stem are hollow, in order to define themselves an air suctioning channel from the suction pad.

The travel of the stem between the completely extended position and the completely retracted position corresponds to the travel of the robotic arm that the device allows to compensate for.

Generally, the body and the stem of the device are made of anodized aluminum.

There are embodiments wherein the stem is free to rotate with respect to the device body, and embodiments wherein such a rotation is prevented.

A restriction of the nowadays available solutions is that the stem cannot be stopped at a given extension, i.e. cannot be stopped by a given stroke with respect to the body, this circumstance being potentially useful in different applications.

Another restriction consists in that the stem can slide with respect to the body too much quickly, thus triggering transient swinging phenomena before the suction pad supported by the device stops.

US 2016/076563 and KR 100883882 describe a suspension provided with stem braking means, pneumatically activated and acting radially in order to slow down or stop the travel thereof.

JP 4106450 describes suspensions comprising a pneumatic system driving the stem stroke.

Other solutions known to the art are described in JP 2010-188483, U.S. Pat. No. 5,193,776, EP 3100833, and JP 2010-188436.

SUMMARY OF THE INVENTION

Object of the present invention is to provide a suspension device of suction pads for manipulators which overcomes the limits of the known solutions, being easy to realize, effective, and robust and durable at the same time.

In a first aspect the present invention therefore relates to a device according to claim 1 for the suspension of suction pads of manipulators, also called level compensator or buffer device.

In particular, the device comprises a body, preferably of monoblock type, i.e. made in a single piece, and a stem passing through the body, or telescopically constrained thereto, and sliding between an extended position and a retracted position.

The body is intended to be tightly constrained to a manipulator, for example a robotic arm. The stem travel with respect to the body of the device corresponds to the maximum displacement of the robotic arm that the device allows to compensate for.

An elastic element, for example a spring, is functionally interposed between the body and the stem of the device, with the task of constantly applying a thrust on the stem to bring it to the extended position.

The device is hollow to allow the suction of the air from the suction pad constrained to the stem. In other words, the stem has an inner channel which fluidically communicates the suction pad constrained at a distal end of the stem, with an external air suctioning line constrained to the opposite end of the stem, named proximal end.

Advantageously, the suspension device also comprises an own braking device to brake the stem. The braking device in turn comprises a pad movable between a forward position, at which it applies a pressure onto the stem sufficient to slow down the travel thereof or stop it completely, according to the user's choice, and a rearward position, at which the pad does not interact with the stem, or at most it rests against the stem without hindering the movements thereof. The pad moves in response to the stresses imparted by an actuator of the braking device.

The presence of the braking device allows stopping the stem at the desired position with respect to the body of the suspension device, by applying on the pad a pressure above an identifiable threshold level, for example by some tests and, if appropriate, allows the movement of the stem to be slowed down, by applying on the pad a pressure lower than the threshold value.

When the pad is not urged towards the stem, the latter is not affected by the pad, even if this was resting on the stem.

Preferably the pad comprises a front surface intended to move into abutment against the side surface of the stem, and for this reason it can have a shape complementary thereto.

Preferably the pad comprises an inclined surface providing an inclined plane- or wedge-coupling, with the actuator of the braking device. More preferably the inclined surface is a back surface opposite to the front surface.

Alternatively, the pad is prompted into action by gears, or by a magnet. In the preferred embodiment the actuator is susceptible of movements parallel to the longitudinal axis X-X, i.e. movements parallel to the sliding axis of the stem with respect to the body of the suspension device. The pad is on the contrary susceptible of movements along a direction orthogonal to the axis X-X, i.e. a direction intercepting the stem.

Preferably the braking device comprises a spring or an equivalent preloaded resilient element countering the actuator. The spring applies a thrust directed to bring the actuator back into its initial, inactive position; depending on the configuration chosen for the assembly, this results in the inactive braking device not braking the stem, whereas when it is activated it brakes the stem, or vice versa.

Preferably the braking device comprises a cylindrical seat, which can also be defined as actuator chamber. The actuator is an air piston movable in the cylindrical seat in response to the thrust applied by a pressurized fluid, for example, compressed air, supplied to the braking device. The piston comprises at least one contact surface intended to interact with the inclined back surface of the pad in order to apply the thrust needed to move the pad into abutment against the stem. In other words, the piston is shaped such that the respective movements in longitudinal direction cause pad displacements in transverse direction.

In the preferred embodiment the contact surface is an inclined plane, or a wedge, or a cylinder mounted on board the piston. Preferably the piston comprises two side by side cylinders, one of which contacts the inclined back surface of the pad.

In the preferred embodiment the pad can be installed in the braking device in two angular positions staggered by 180° from one another. This characteristic allows the braking device to be configured in two modes, according to the user's choice: a mode wherein the braking device is active and the stem is braked, when the actuator is inactive, and the inverse mode, wherein the braking device is active and the stem braked, when the actuator is active. In fact the braking of the stem can be achieved by means of the spring or, alternatively, by means of the actuator, depending on how the pad is mounted.

Preferably the braking device is coupled with the body, for example screwed thereto, and has a sliding seat for the stem; the pad fronts on said seat.

LIST OF THE FIGURES

Further characteristics and advantages of the invention will be more highlighted by the review of the following specification of a preferred, but not exclusive, embodiment illustrated for illustration purposes only and without limitations, with the aid of the accompanying drawings, wherein.

DETAILED DESCRIPTION OF THE INVENTION

Figures 1, 2:
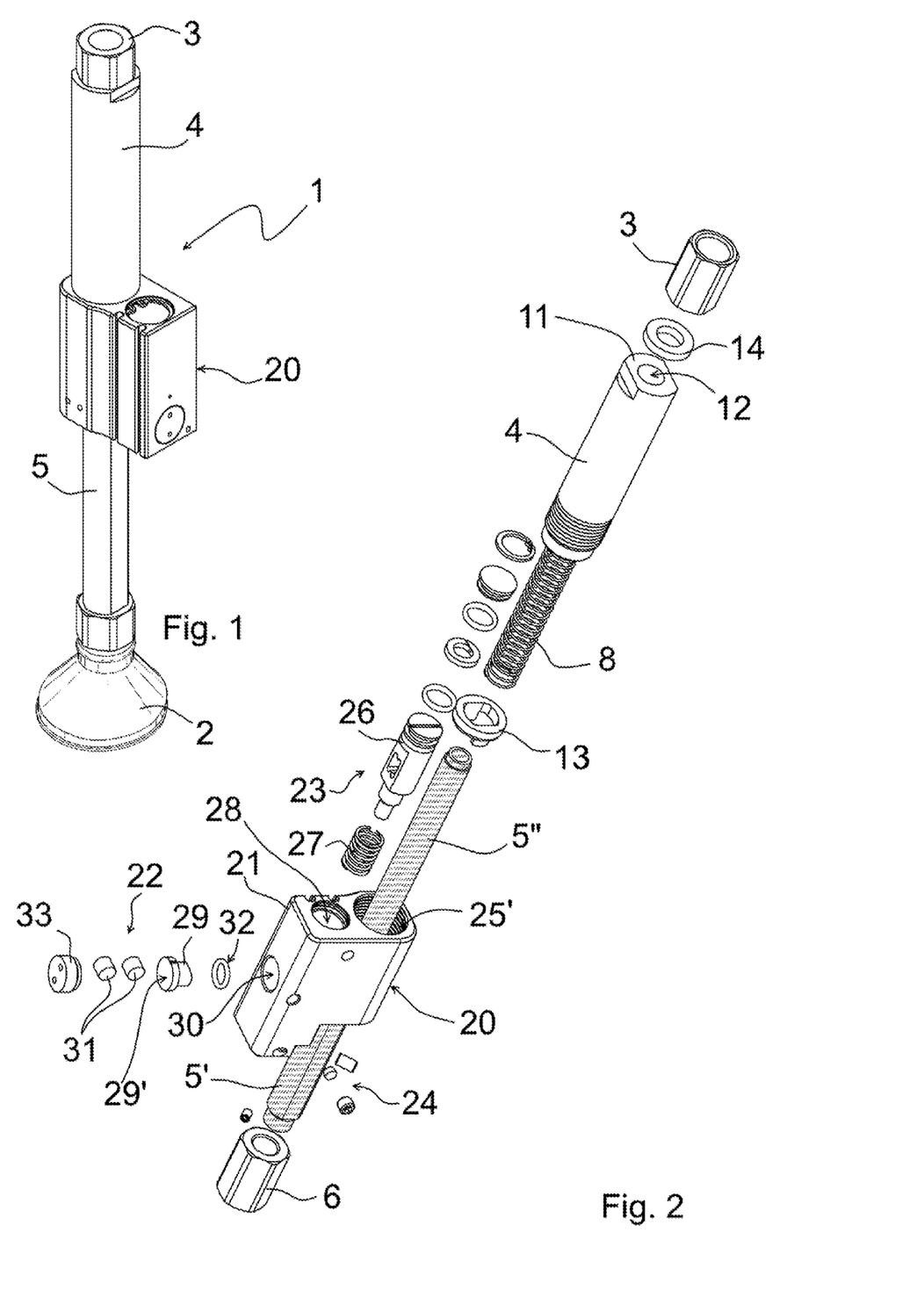
FIG. 1 is a perspective view of a first suspension device according to the present invention, provided with suction pad.
FIG. 2 is an exploded view of the suspension device shown in FIG. 1, not provided with the suction pad.

FIGS. 1-5 show a first embodiment 1 of the suspension device according to the present invention. Specifically, FIG. 1 shows a suspension device 1 according to the present invention, provided with a corresponding suction pad 2 and connected to an air suctioning line at the nipple 3.

The suspension device 1, which can also be defined as buffer device or level compensator, comprises a body 4 intended to the constrained to a robotic arm, for example by means of brackets and vises, and a stem 5 inserted through the body 4 and translatable with respect thereto.

In the version shown in the figures the stem 5 is through, i.e. crosses the body 4 through its whole length; however, in general, a device according to the present invention can be implemented also with the stem 5 not through, such that the end 5" of the stem 5 is not exposed.

The lower end of the stem 5—named distal end—is the one bearing the suction pad 2, and the upper end—named proximal end—is the one connected with the air suctioning line. The terms distal and proximal are chosen in reference to the position with respect to the robotic arm, when the suspension device 1 is in use.

In reference to FIGS. 1-5, the stem 5 is made in a single piece, but it could be in two parts 5' and 5" fixable to one another, for example able to be screwed. The lower part 5' includes the distal end 6 to which the suction pad 2 is screwed, and the upper part 5" includes the nipple 3 to which the suctioning line is screwed.

In general, the stem 5 is passing through the body 4 or is telescopic; in the attached drawings the stem 5 is through.

The lower part 5' of the stem 5 has non-circular cross-section, in order to prevent the rotation of the stem 5 with respect to the body 4 when the suspension device 1 is in use, and the upper part 5" has circular section.

The suspension device 1 further comprises a spring 8 housed in the body 4, whose function is to counter the longitudinal movements of the stem 5, as it will be described now.

With the reference numeral 14 a rubber gasket is denoted having the task of absorbing the abutment of the upper part 5" of the stem 5 against the body 4.

Figure 3:
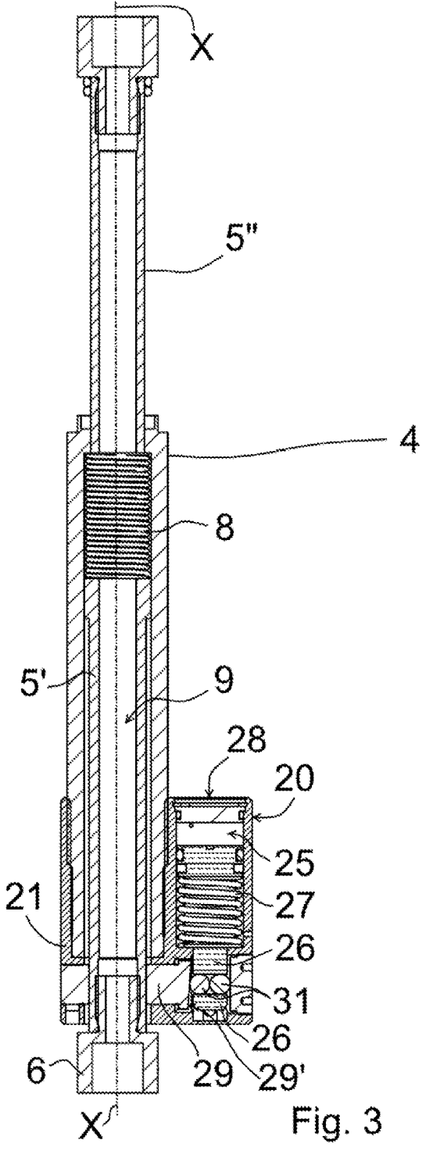
FIGS. 3 and 4 are longitudinal sectional views of the suspension device shown in FIG. 1, respectively in retracted configuration and extended configuration.
Figure 4:
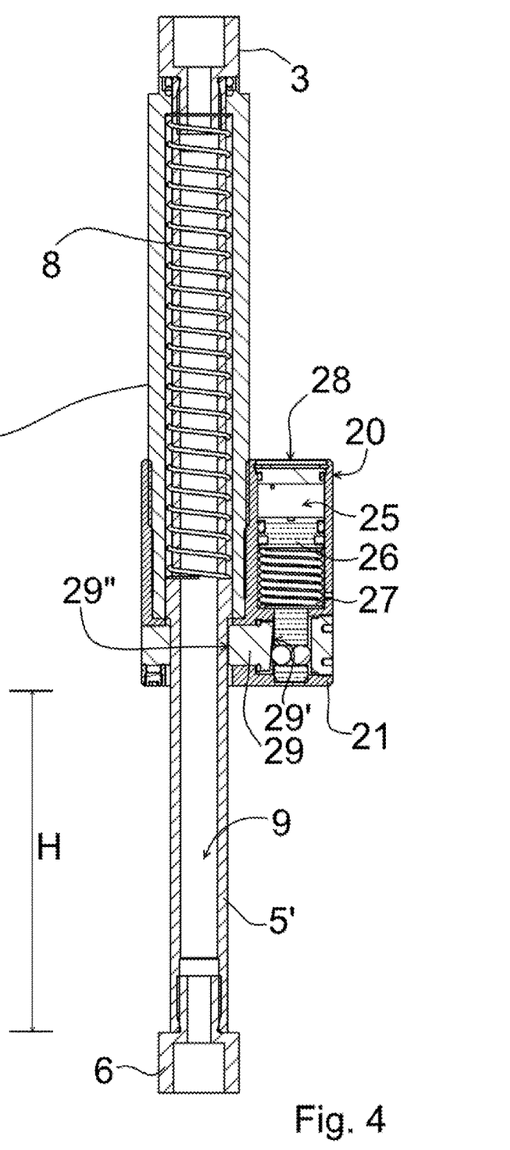

FIGS. 3 and 4 are sectional views of the suspension device 1 taken along a same vertical plane containing the longitudinal axis X-X of the device 1 itself.

The stem 5 is hollow inside. The recess 9 defines an inner channel for suctioning the air, which is therefore drawn by the suction pad 2, crosses the whole stem 5 and flows out through the suctioning line, for example a line available on the robotic arm to which the body 4 is fastened.

In FIG. 3 the stem 5 is shown in its completely retracted position, i.e. with the distal end 6 at the minimum distance from the body 4, which in the example shown corresponds to the distal end 6 abutting against the lower edge of the body 4. In FIG. 4 the stem 5 is shown in its completely extended position, i.e. with the distal end 6 at the maximum distance from the body 4.

Since the stem 5 is through, in the completely extended position the proximal end (nipple) 3 abuts against the upper edge of the body 4, and the spring 8 is also extended. In the completely retracted position the proximal end (nipple) 3 is far from the upper edge of the body 4, and the spring 8 is compressed.

The spring 8 is preloaded such to constantly apply a thrust on the stem 5 in order to bring it to the completely extended position shown in FIG. 4.

With the reference H the travel that the stem 5 can run is denoted. This is the compensation travel that allows having a corresponding margin in the displacements of the robotic arm towards the gripping position of the objects to be moved. It is just the robotic arm which compresses the spring 8: when the suction pad 2 reaches the object to be picked up and abuts onto the same, further possible movements forward of the robotic arm towards the object are assisted by the suspension device 1, such that the suction pad 2 does not apply in turn a thrust on the object.

Preferably the upper, or proximal, end 11 of the body 4 is in fact seamless, meaning that it is not subjected to milling and material removal. As it can be better appreciated in FIG. 2, the proximal end 11 extends around the hole 12, which is the seat of the stem 5, along the whole circumference, seamlessly.

This characteristic results in the body 4 being much more robust than the body of the known devices, the material and design being the same. Even if the body 4 is made of aluminum, the end 11 is not deformable, indeed because it is seamless and is not subjected to failures.

The hole 12 is passing through the body 4. Advantageously, at the proximal end 11 the walls of the hole 12 define an area complementary to the cross section of the stem 5, and in particular of the upper part 5".

In order to prevent the rotations of the stem 5 on the axis X-X, the device 1 comprises a shaped washer 13 defining a hole shaped complementarily to the cross section of the lower part 5' of the stem 5. When the suspension device 1 is assembled, the washer 13 is integral with the body 4: the stem 5 is therefore sliding in the hole 12, but due to the complementarity of the shapes—just described—it cannot rotate on the axis X-X with respect to the body 4.

Alternatively, the body 4 or the braking device 20 can have inner guide surfaces of the stem 5, which prevent it from rotating. Still alternatively, the rotation can also be prevented by the pad 29 against the non-circular part of the stem 5.

The suspension device 1 comprises a braking device 20 coupled with the body 4 and having the function of slowing down the stroke movement of the stem 5 with respect to the body 4, until preventing the respective movement, if required.

The braking device 20 in turn comprises a body 21 which, in the example shown in the figures, is screwed to the tubular body 4 of the suspension device 1. The body 21 has a seat 25' for the housing of a part of the body 4 of the suspension device 1 and for the associated stem 5. The stem 5 slidingly crosses the body 21 of the braking device 20, in order to be telescopically movable as explained afore.

In the body 21 different components, denoted on the whole with the reference numerals 22, 23 and 24 are housed, whose structure and function will be now explained more in detail.

Figure 5:
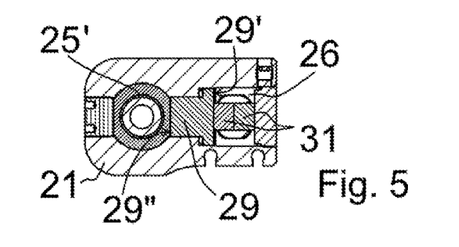
FIG. 5 is a cross sectional view of the suspension device shown in FIG. 1.

In reference specifically to FIGS. 3-5, inside the body 21 also a cylindrical seat 25 is defined in which a piston 26 is movable by pneumatic actuation, countered by a spring 27 also positioned in the cylindrical seat 25. By the action exerted by the compressed air supplied to the inlet 28, the piston 26 is susceptible of reciprocating movements along an axis parallel to the axis X-X and, thus, parallel to the stem 5. The compressed air urges the piston 26 downwards and the spring 27 brings it back to the initial, lifted, position when the stress ends.

In the body 21 of the braking device 20 a pad 29 is also present and housed in a proper seat 30 and susceptible of reciprocating movements in a direction orthogonal to the axis X-X, and thus orthogonal to the stem 5, in response to the movements of the piston 26.

The piston 26 comprises at least one contact surface 31 intended to apply on the pad 29 the thrust needed to bring it into abutment against the side surface of the stem 5. In the example shown in FIGS. 1-5 the contact surface 31 consists of two cylinders mounted on board the piston 26. The outer surface of the cylinders, being indeed cylindrical, allows the friction between the piston 26 and the pad 29 to be hold minimum. FIG. 5 is a cross section taken on a plane orthogonal to the axis X-X just at the height of the cylinders 31.

The pad 29 comprises an inclined back surface 29' facing towards the piston 26, intended to interact with the cylinders 31, and a front surface 29" intended to interact with the side surface of the stem 5, specifically with the side surface of the lower part 5' of the stem 5.

Just by virtue of the presence of the inclined back surface 29', the vertical movements of the piston 26 and the cylinders 31 cause horizontal movements of the pad 29.

The operation of the braking device is simple, and will be now explained based on the comparison between FIGS. 3 and 4.

In FIG. 3 the stem 5 is completely retracted with respect to the body 4 of the suspension device 1 and the compressed air does not reach the braking device 20. Therefore, the spring 27 holds the piston 26 lifted, i.e. as close to the inlet 28 as possible, and in this circumstance the cylinders 31 are also at the maximum height. Due to the inclination of the back-countercheck surface 29', the cylinders 31 apply a thrust on the pad 29 which is therefore firmly pressed against the stem 5, braking it.

In other words, the pad 29 is held pressed against the stem 5, which is therefore stopped without being able to move with respect to the body 4. The configuration shown in FIG. 3 therefore corresponds to the active braking device 20 and to the braked stem 5, stopped.

Clearly this position of the pad 29 can be reached regardless of the position of the stem 5, which can therefore be stopped also at half of its nominal stroke.

FIG. 4 shows the stem 5 completely extended and ready for compensating a movement of the robotic arm with whom the device 1 is combined. The thrust from top to bottom applied by the compressed air supplied to the inlet 28 acts on the piston 26: the piston 26 is completely lowered. The cylinders 31 do not apply pressure on the pad 29 which, therefore, in turn slides on the outer surface of the stem 5 without applying a pressure sufficient to stop the sliding of the stem 5 itself.

In other words, the configuration shown in FIG. 4 corresponds to the braking device 20 not active and to the stem 5 free to slide in the body 4 of the suspension device 1.

Figure 6:
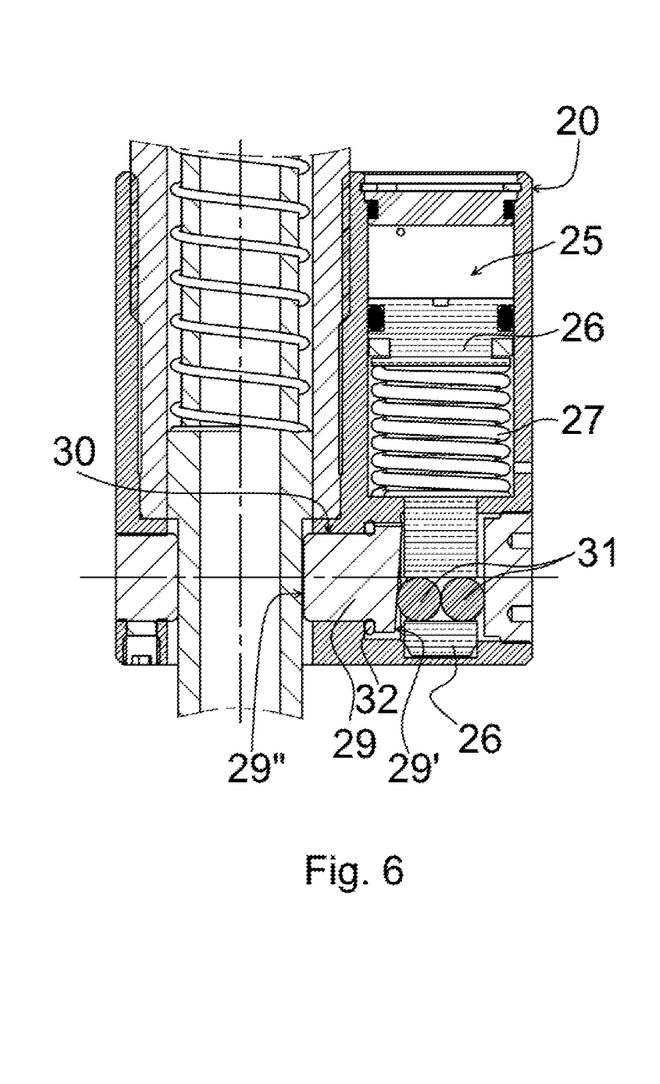
FIGS. 6 and 7 are sectional magnifications of the suspension device shown in FIG. 1, in two corresponding assembly configurations.

FIG. 6 is a magnification of FIG. 4. The inclination of the back surface 29' of the pad 29 is purposely exaggerated in order to make the operation principle clearer. The stroke of the pad in its own seat 30 is minimum and in practice corresponds to the elastic compression of the gasket 32 shown in FIG. 2.

At the moment the compressed air is no more supplied to the braking device 20, the spring 27 brings the piston 26 back to lifted position, i.e. to the position of normally braked, shown in FIG. 3.

Figure 7:
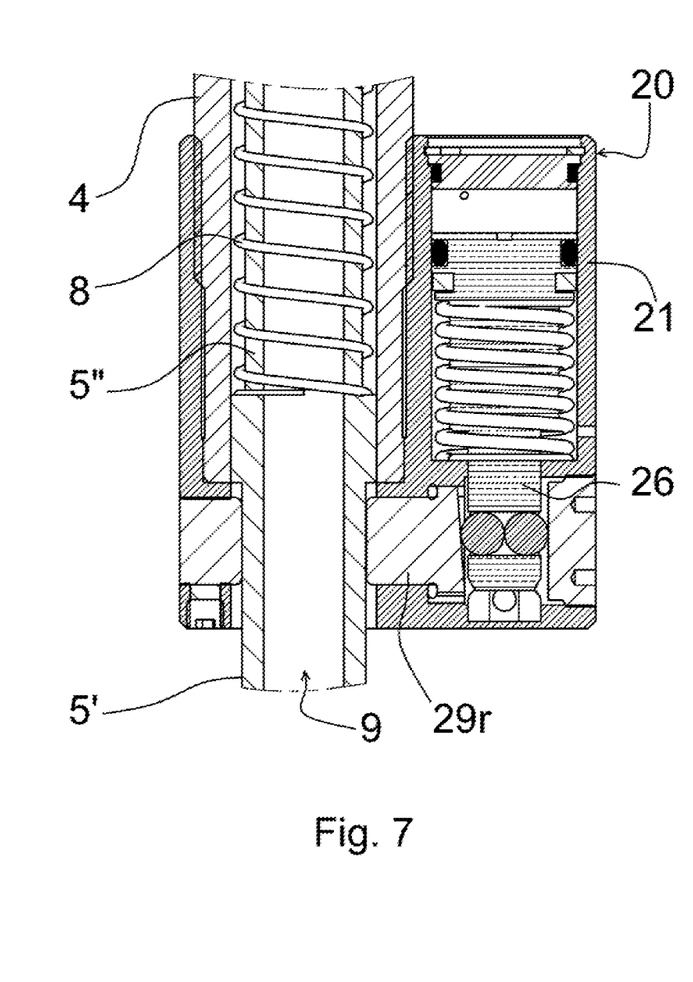

FIG. 7 shows a reverse configuration of the braking device 20 wherein the pad 29r is mounted reversed with respect to the configuration shown in the preceding figures, i.e. rotated by 180° on its own axis. This way the inclination of the back surface 29' is opposite with respect to the inclination shown in the preceding figures: in the configuration of FIG. 6 the surface 29' ascends displacing towards right and, in the configuration of FIG. 7, the surface 29' descends displacing towards right. This simple inversion of the inclination remarkably modifies the operation of the braking device 20. In fact in the solution shown in FIG. 7 the inactive position of the braking device 20, in absence of compressed air and with the piston 26 lifted, corresponds to the unbraked position of the pad 29r, since the pad 29r does not apply pressure on the stem 5, whereas the lowered position of the piston 26, urged by the compressed air, corresponds to the braked position of the pad 29r, i.e. the position wherein the pad 29r brakes/stops the stem 5.

The presence of the cylinders 31 is, generally, optional. In fact the cylinders can be replaced by an inclined plane of the piston 26, i.e. an inclined plane which urges the pad 29 as a wedge. The selection of the cylinders 31 is advantageous in order to minimize the friction.

In the examples shown in the figures the braking device 20 can be pneumatically actuated. Generally, however, the piston 26 can also be actuated by an electric actuator, for example a small linear guide or gears, or a magnetic actuator, for example an electromagnet.

The actuation of the braking device 20 allows the movement of the stem 5 to be completely stopped, or the sliding thereof to be slowed down with respect to the body 4, depending on the thrust applied on the pad 29, i.e. depending on the position taken by the piston 26 from time to time.

It is also clear that instead of the spring 27 the braking device 20 can integrate another type of elastic element, with equivalent operation.

In the embodiments shown in FIGS. 1-7 the cylindrical seat 25, wherein the piston 26 is movable, is above the spring 27; in particular, the spring 27 is fitted on the piston 26 at a length of the piston 26 itself comprised between the cylinders 31 and the inlet 28 to the chamber 25.

As it can be easily understood from FIG. 2, the assembly of the braking device is simple: the components 23 are inserted in the cylindrical seat 25 from above, through the opening 28, and the components 22 are inserted laterally, through the opening 30, which is then closed with the grub screw 33.

Figure 8:
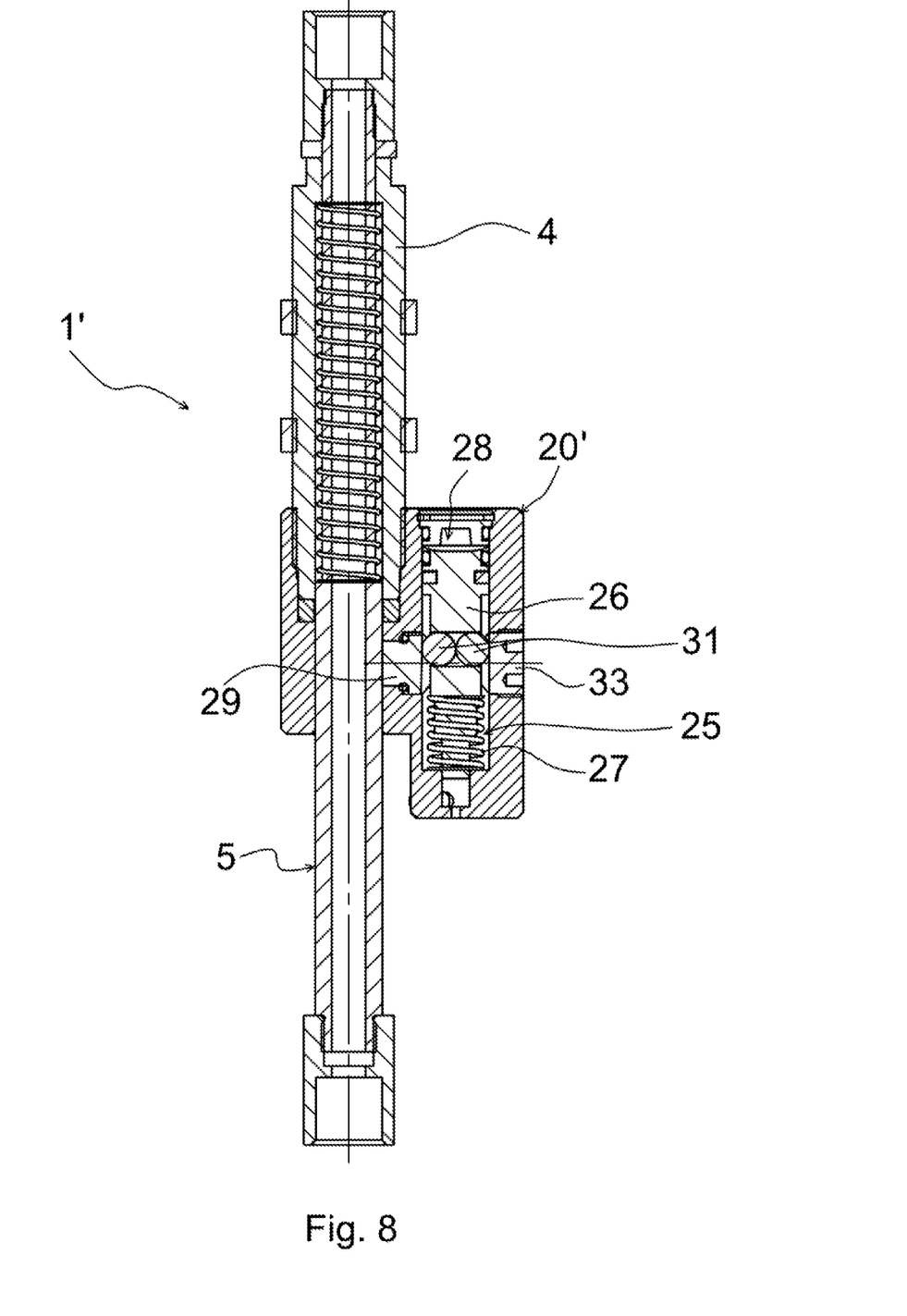
FIG. 8 is a longitudinal sectional view of a second suspension device according to the present invention.

In the alternative embodiment 1' shown in FIG. 8, the braking device 20' has a slightly different structure compared to the one described afore. In the example of FIG. 8, in fact, the spring 27 is on the side of the inlet 28 opposite to the chamber 25 with respect to the cylinders 31.

Figure 9:
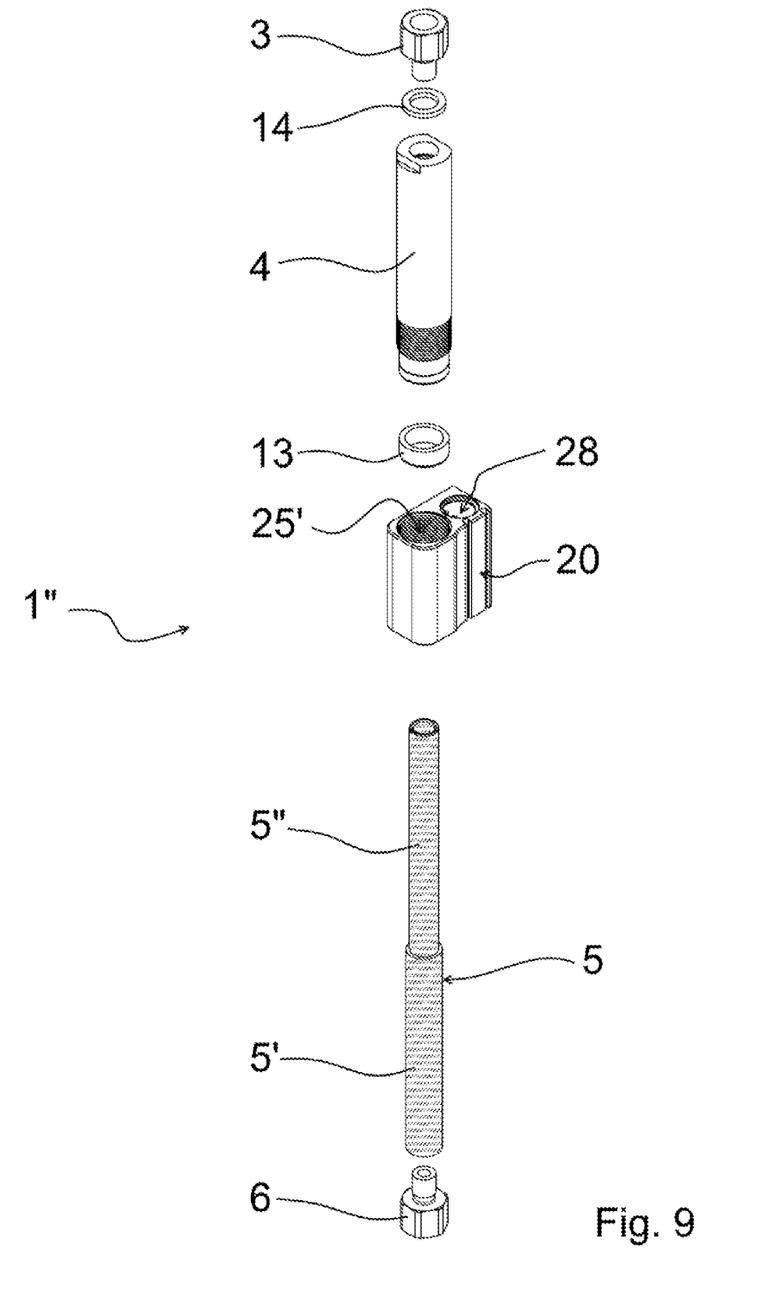
FIG. 9 is an exploded view of a third suspension device according to the present invention.

In the alternative embodiment 1" shown in FIG. 9, the stem 5 has circular section, i.e. the two parts 5' and 5" both have circular cross-section, and the washer 13 is absent or perfectly circular.

This embodiment can be used in those applications wherein the rotation of the stem 5 is allowed.

Thus, the two versions (with and without rotation of the stem) can be made with minimum variations.

The invention claimed is:

1. A suspension device (1) of suction pads (2) of manipulators, the suspension device comprising:
a body (4) fixable to a manipulator;
a stem (5) passing through the body (4), or telescopically constrained thereto, and sliding with respect to the body (4) between a retracted position and an extended position, along a longitudinal axis (X-X);
an elastic element (8) to counter the movements of the stem (5), and wherein a distal end (6) of the stem (5) is constrainable to a suction pad (2) and the stem (5) is hollow to allow the air to be suctioned from said suction pad (2), and
a braking device (20) having a pad (29) movable between a forward position, at which it applies a pressure onto the stem (5) sufficient to slow down the travel thereof or stop it completely, and a rearward position, at which the braking device pad (29) does not interact with the stem (5) or at most it rests on the stem (5) without hindering the movements thereof, in response to the stresses imparted by an actuator (26), wherein the braking device (20) comprises a cylindrical seat (25) and the actuator (26) is an air piston movable in said cylindrical seat (25) in response to the thrust applied by a pressurized fluid supplied to the braking device (20), and wherein the piston (26) comprises at least one contact surface (31) intended to interact with an inclined back surface (29') of the braking device pad (29) in order to apply the thrust necessary to move the braking device pad (29) in abutment against the stem (5), and wherein the at least one contact surface (31) is an inclined plane, or a wedge, or a cylinder mounted on board the piston (26).

2. The device (1) according to claim 1, wherein the braking device pad (29) comprises an inclined back surface (29') and an opposite front surface (29"), wherein the front surface (29") is configured to move in abutment against the side surface of the stem (5) and the inclined back surface (29') provides an inclined-plane or wedge coupling with the actuator (26).

3. The device (1) according to claim 1, wherein the actuator (26) is susceptible of movements parallel to the longitudinal axis (X-X), and the braking device pad (29) is susceptible of movements along an orthogonal direction.

4. The device (1) according to claim 1, wherein the braking device (20) comprises a spring (27) or equivalent resilient, preloaded element countering the actuator (26).

5. The device (1) according to claim 4, wherein the braking position of the stem (5) is achieved by means of the spring (27) or, alternatively, by means of the actuator (26).

6. The device (1) according to claim 1, wherein the elastic element (8) consists of a spring housed in the body (4) and functionally interposed between the stem (5) and the body (4) itself.

7. The device (1) according to claim 1, wherein the braking device (20) is coupled with the body (4), and has a seat (25') for the sliding of the stem (5), and wherein the braking device pad (29) fronts onto said seat (25').

8. A suspension device (1) of suction pads (2) of manipulators, the suspension device comprising:
a body (4) fixable to a manipulator;
a stem (5) passing through the body (4), or telescopically constrained thereto, and sliding with respect to the body (4) between a retracted position and an extended position, along a longitudinal axis (X-X);
an elastic element (8) to counter the movements of the stem (5), and wherein a distal end (6) of the stem (5) is constrainable to a suction pad (2) and the stem (5) is hollow to allow the air to be suctioned from said suction pad (2), and a braking device (20) having a pad (29) movable between a forward position, at which it applies a pressure onto the stem (5) sufficient to slow down the travel thereof or stop it completely, and a rearward position, at which the braking device pad (29) does not interact with the stem (5) or at most it rests on the stem (5) without hindering the movements thereof, in response to the stresses imparted by an actuator (26); wherein the braking device pad (29) comprises an inclined surface (29') which provides an inclined-plane or wedge coupling with the actuator (26), and wherein the braking device pad (29) can be installed in the braking device (20) according to two angular positions, staggered by 180° from one another, to achieve inverse configurations.

9. A suspension device (1) of suction pads (2) of manipulators, the suspension device comprising:
   a body (4) fixable to a manipulator;
   a stem (5) passing through the body (4), or telescopically constrained thereto, and sliding with respect to the body (4) between a retracted position and an extended position, along a longitudinal axis (X-X);
   an elastic element (8) to counter the movements of the stem (5), and wherein a distal end (6) of the stem (5) is constrainable to a suction pad (2) and the stem (5) is hollow to allow the air to be suctioned from said suction pad (2), and
   a braking device (20) having a pad (29) movable between a forward position, at which it applies a pressure onto the stem (5) sufficient to slow down the travel thereof or stop it completely, and a rearward position, at which the braking device pad (29) does not interact with the stem (5) or at most it rests on the stem (5) without hindering the movements thereof, in response to the stresses imparted by an actuator (26), wherein at least one part (5") of the stem (5) has non-circular cross-section and is guided by a corresponding non-circular element (4, 13, 20, 29), so that the stem can slide along the longitudinal axis (X-X) but cannot rotate.

\* \* \* \* \*